(No Model.) 2 Sheets—Sheet 1.

J. P. B. FISKE.
RHEOSTATIC CONTROLLER FOR ELECTRIC MOTORS.

No. 485,619. Patented Nov. 8, 1892.

WITNESSES.
Alec F. Macdonald.
A. D. Orne

INVENTOR.
Jonathan P. B. Fiske
per Bentley & Blodgett
Attys (No Model.)
J. P. B. FISKE.
RHEOSTATIC CONTROLLER FOR ELECTRIC MOTORS.
No. 485,619. Patented Nov. 8, 1892.
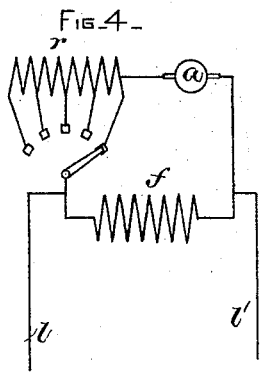
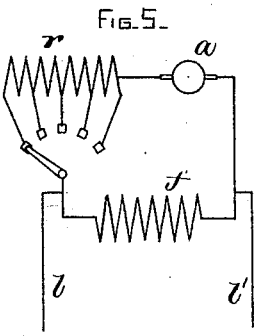
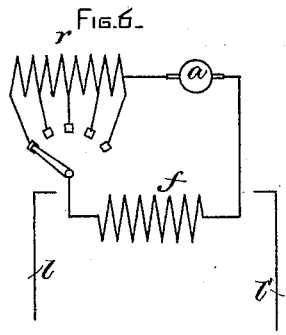
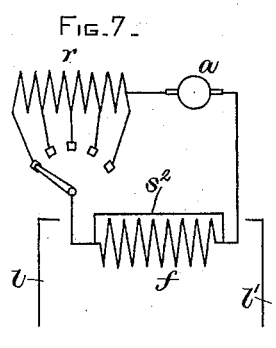
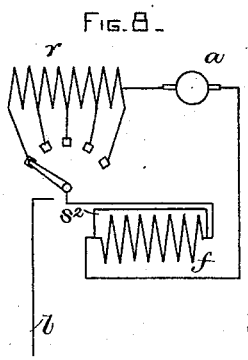
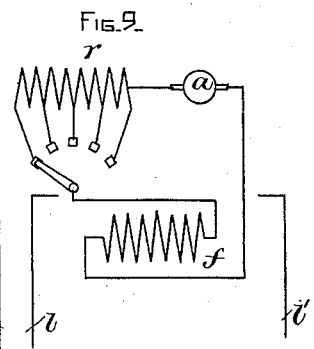
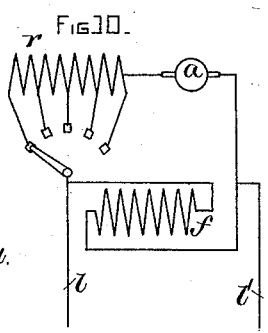
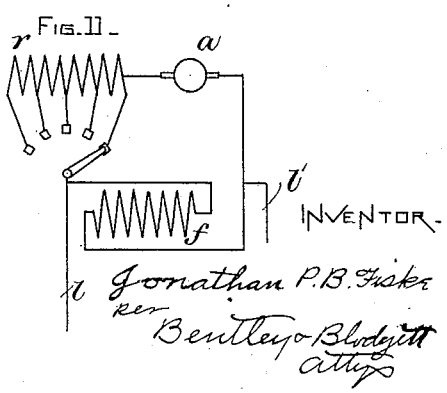
WITNESSES.
Alec F. Macdonald.
A. O. Drue
INVENTOR.
Jonathan P. B. Fiske.
per Bentley & Blodgett
Attys

UNITED STATES PATENT OFFICE.

JONATHAN P. B. FISKE, OF LYNN, MASSACHUSETTS, ASSIGNOR TO THE THOMSON-HOUSTON ELECTRIC COMPANY, OF CONNECTICUT.

RHEOSTATIC CONTROLLER FOR ELECTRIC MOTORS.

SPECIFICATION forming part of Letters Patent No. 485,619, dated November 8, 1892.

Application filed February 5, 1892. Serial No. 420,387. (No model.)

*To all whom it may concern:*

Be it known that I, JONATHAN P. B. FISKE, a citizen of the United States, residing at Lynn, in the county of Essex and State of Massachusetts, have invented certain new and useful Improvements in Rheostatic Controllers for Electric Motors, of which the following is a specification.

This invention is an improvement in rheostatic controllers for electric motors, and embodies a novel construction whereby an efficient control of electric motors is obtained, enabling them to be started, stopped, and reversed with quickness, facility, and safety.

The invention is particularly adapted for use with electric motors used with elevators and hoisting work where it is necessary that the motor be protected from injury due to carelessness and unskilled use, while remaining susceptive to prompt control.

Figure 1:
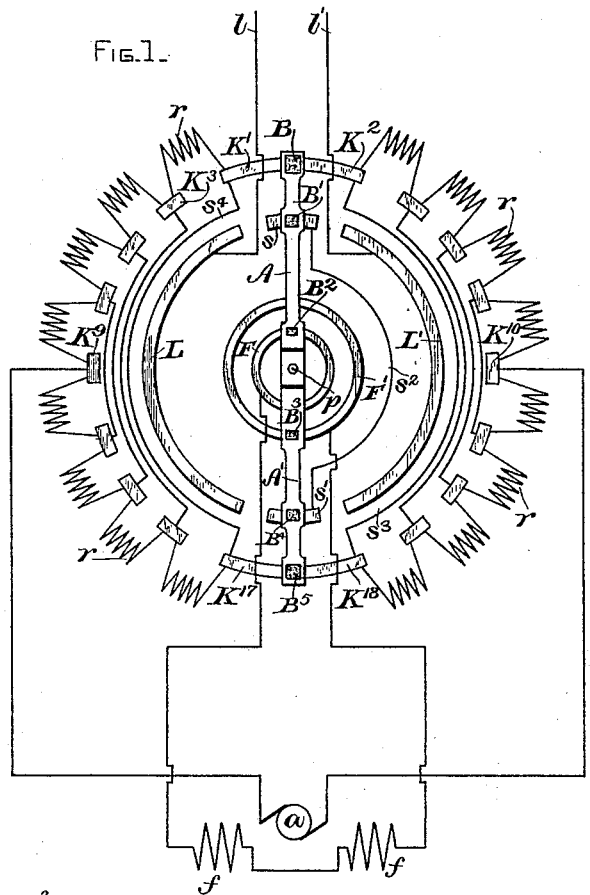
Figure 2:
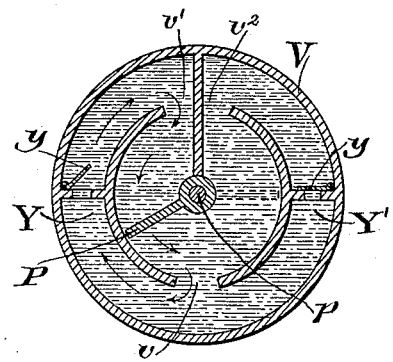
Figure 3:
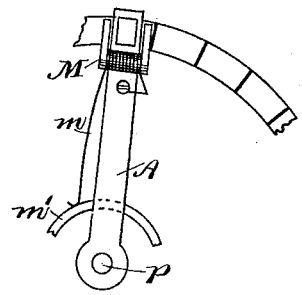

In the accompanying drawings, Figure 1 is a plan of a rheostatic controller embodying my invention with a diagram of its connections. Figs. 2 and 3 show details, and Figs. 4 to 11 are diagrams showing the successive positions of the switch.

Connections $l\ l'$ lead from the supply-lines to line segment contacts L L' of the rheostatic switch. The switch-lever has two insulated arms A A', one carrying brushes B B' $B^2$ and the other brushes $B^3$ $B^4$ $B^5$. Brushes B' $B^4$ traverse the line-contacts L L'. Brushes $B^2$ $B^3$ bear, respectively, on field-magnet ring terminals F F'. Brushes B $B^5$ traverse rheostat-contacts K' $K^2$ $K^3$, &c., arranged in a circular series and connected by resistances $r$. The armature connections are made to the rheostat-contacts $K^9$ $K^{10}$ midway between the terminal contacts K' $K^2$ and $K^{17}$ $K^{18}$. When the switch is in the position indicated in Fig. 1, the brushes B $B^5$ rest, respectively, on the rheostat-terminals K' $K^2$ and $K^{17}$ $K^{18}$. The brushes B' $B^4$ rest on short segments $s\ s'$, insulated from the line-segments L L', but connected together by cross-connection $s^2$. The line is therefore cut off from the motor. By turning the switch-lever in either direction connection is made with the line-terminals L L', and the current is led therefrom through brushes B' $B^4$ to arms A A', whence it passes in multiple through the brushes $B^2$ $B^3$ to the field-magnet $f$, and through brushes B $B^5$ and the rheostat contacts and resistances to the armature $a$. By turning the lever through a quarter-turn all the resistances are cut out of the armature-circuit and the current is fully turned on. This condition is indicated diagrammatically in Fig. 4.

To stop the motor, the switch-lever is again turned back, so as to cut all the resistances into the armature-circuit, as in Fig. 5, and then to break contact with the line-terminals, Fig. 6, a path for the field-magnet discharge still being maintained through the armature. Immediately afterward the lever comes onto contacts $s\ s'$, and a short circuit $s^2$ for the field independent of the armature and resistances is provided, Fig. 7. At the same time the armature is put on a closed circuit through the resistances independent of the field-magnet. This causes a reversed current to flow through the armature due to the fact that the armature is now running as a generator, and the breaking action thereby set up tends to bring the armature to rest. The presence of the resistance $r$ in this short circuit on the armature prevents a dangerously-strong current through the same. The short-circuiting of the field-magnet tends to prevent the sparking which would occur when the motor is reversed by reversing its field-magnet connections, which is accomplished by this apparatus in the following manner: The motion of the switch-lever being continued beyond the stopping-point, the armature connections are replaced in the same relation to the resistances and the line-contacts, the rheostat-contacts being cross-connected for this purpose, as shown in Fig. 1. The relation of the field connections to the armature connections are, however, reversed, as the brushes B $B^5$ pass from contacts K' $K^{18}$ to contacts $K^2$ $K^{17}$. The connection of the field-magnet to the shunt connection $s^2$ is meanwhile maintained.

This reversal of the field and its shunt with respect to the armature is indicated in Fig. 8. Further movement of the lever breaks the connection at B' $B^4$ with shunt $s^2$, and the condition shown in Fig. 9 results, with the field-magnet reversed with relation to the armature. Then when the lever makes contact with the line-contacts the armature stands in the same relation to the line as before, but the field-magnet relation is reversed, as shown in Fig. 10. The motor thus runs in the opposite direction, and by cutting out the resistances, as in Fig. 11, it may be brought to full speed.

It is desirable to reverse the field-magnet instead of the armature connections for the following reasons: The requisite connections are simpler. The strain in the armature is not so severe in case of accidental reversal. The danger of injury to the motor from sudden reversal of the connections when running at high speed is greatly lessened. If the field is still excited when such reversal takes place, the motor, acting as a generator, sets up an electro-motive force in the direction of the line-current, the resulting electro-motive force and current being possibly double that which the motor is adapted to stand. Serious injury to the motor may thus result. To prevent this generation of an additional electro-motive force at the moment of reversal, I provide the shunt $s^2$, which brings the armature to rest before reversal of the field-magnet, the discharge of the field-magnet being then insured by the reversal of the current therethrough, and before the field-magnet has time to build up again the momentum of the armature will have been arrested by the effect of the load and the breaking action of the armature-current through the rheostat and the shunt-circuit $s^2$ during the time that the field magnetism is falling and building up.

Another advantage of the reversal by reversing the field-magnet is that the gradual building up of the field-magnet gives a gradual increase of torque for a short interval of time, so that the load starts more smoothly.

While I have shown an extra cross-connection $s^2$ for short-circuiting the field and armature, this is not absolutely necessary, as the cross-connections $s^4$ $s^3$ of the final contacts K' K$^{17}$ and K$^2$ K$^{18}$ also establish this short circuit, and this manner of forming the bridging connection is equally within my invention. The contacts $s$ $s'$, however, give a longer time for the aforesaid breaking action on the armature. It is necessary to prevent the full potential of the line from being turned on to the armature until the field-magnet has had time to attain its full strength and the armature has speeded up sufficiently to cut down the electro-motive force to that which the armature is adapted to take. For this purpose I provide a dash-pot (shown in Fig. 2) consisting of a plunger or piston P, connected to the lever A A' and working within a chamber containing a fluid, such as oil. The piston P is preferably a valve or rotating piston secured on the pivot $p$ of lever A A' and working in a circular chamber V, having ports $v$ $v'$ $v^2$ at points near the extreme positions of the piston, the port $v$ communicating with ports $v'$ $v^2$ by external passages Y Y', containing check-valves $y$ $y'$. Each side of the cylinder V, together with the passage Y or Y', communicating therewith through openings $v$ $v'$ or $v$ $v^2$, forms a circulatory passage, through which the fluid may be driven by the piston, subject to the checking action of the valve $y$ or $y'$. Thus when the lever A A' is turned either way from the middle or off position the piston drives a column of fluid up one side of the cylinder and down the outer passage, instantly closing the check-valve, so that continued movement of the lever is retarded, being only as rapid as is permitted by the leakage of the parts; but on returning the lever to its middle position the valve opens and allows a quick movement, which is desirable in cutting off the current to stop the motion.

In order to disrupt the sparks or arcs formed at the rheostat-contacts as the arm passes over them, a permanent or electro magnet M is provided on the rheostat-lever, having its poles in proximity to such contacts, so as to move with the lever and serve as an arc-disrupter for all of the rheostat-contacts. This magnet is preferably an electro-magnet energized by a current taken in through suitable connections, as the arm A and supplementary contacts $m$ $m'$, leading to the motor connections.

While I have shown my invention as applied to a shunt-wound motor, it is obvious that the method herein set forth of reversing the field-magnet connections is applicable, also, to a series-wound motor. In either case the shunt-circuit is established around said magnet, forming therewith a closed circuit. The connections of said magnet are reversed while this closed circuit is maintained, and the shunt-circuit is then broken. Moreover, the expedient of establishing a shunt for the field-magnet is broadly applicable in reversing an electric motor by reversing the connections of either its field-magnet or its armature—that is, by relatively reversing their connections—for in any case this shunt prevents injurious sparking effects due to a discharge of the field magnetism while such reversal is taking place.

What I claim as new, and desire to secure by Letters Patent, is—

1. The combination, with the shunt-wound motor, of the rheostatic controller having a rheostat connected to the armature, a short circuit connected to the field-magnet and containing a circuit-breaker, and a circuit-reverser in the field-magnet connections.

2. The combination, with a shunt-wound motor, of the rheostatic controller having line-contacts, short-circuiting contacts connected together, brushes connected, respectively, to opposite motor-terminals and bearing alternately on said line-contacts and short-circuiting contacts and breaking contact with the former before making with the latter, and a rheostat having regulating connections to the armature.

3. The combination, with a shunt-wound motor, of the rheostatic controller having line-contacts, short-circuiting contacts connected together, brushes connected, respectively, to the field-magnet terminals and bearing alternately on said line-contacts and short-circuiting contacts, but breaking contact with the former before making with the latter, and a rheostat having regulating-connections to the armature.

4. The combination, with a shunt-wound motor, of a rheostatic controller having two line-contacts, short-circuiting contacts interposed between the same and connected together, contacts connected through resistances to the armature, and a lever carrying brushes connected, respectively, to the field-magnet terminals and bearing on the line-contacts, short-circuiting contacts, and resistance-contacts.

5. The combination, with a shunt-wound motor, of a rheostatic controller connected to and varying the resistance of the armature-circuit, a reversing-switch co-operating therewith to reverse the relations of the armature and field circuits, and retarding devices connected to the operating-lever of the controller and reversing-switch and retarding motion of the same away from the central position in either direction, and releasing devices for the retarding devices operative on the return of the lever, substantially as described.

6. The combination, with a circuit-controlling lever movable both ways from a middle position, of a piston connected to said lever, a chamber wherein the piston moves, and having a continuous circulatory passage on each side and a check-valve in each of such passages, so as to retard the motion of the lever in either direction from a central position, but to permit its free return.

7. The combination, with a series of contacts having circuit connections, of a contact-arm traversing the same and carrying a magnet with its poles in proximity to the contacts, so as to blow out the arc at each of said contacts successively.

8. The combination, with a series of contacts having circuit connections, of a contact-arm traversing the same and carrying an electro-magnet and terminals for said magnet on the arm and connecting with the circuit of the contacts.

9. The method of reversing an electric motor, which consists in closing a shunt-circuit around its field-magnet, reversing the connections of said field-magnet while so shunted, and then breaking such shunt-circuit.

10. The method of reversing a shunt-wound electric motor wherein a resistance is connected in series with the armature, which consists in establishing a short circuit around the field-magnet, so as to form a closed circuit including said magnet and the short circuit and another closed circuit including the armature, resistance, and short circuit, reversing the connections of the field-magnet while maintaining the above circuits closed, and then breaking such short circuit.

11. The combination, with a shunt-wound motor, of an adjustable resistance connected in series with the armature, a short circuit around the field-magnet, reversing-contacts for the field-magnet connection, and contacts in said short circuit mechanically connected together, so as to reverse the field-magnet connections while maintaining such short circuit closed.

12. The combination, with an electric motor, of an adjustable resistance connected in series with the armature, a short circuit around the field-magnet, reversing-contacts for the field-magnet connections, and contacts in said short circuit mechanically connected together, so as to reverse the field-magnet connections while maintaining the short circuit closed.

13. The method of reversing an electric motor, which consists in establishing a shunt-circuit around its field-magnet, then relatively reversing the connections of the field-magnet and armature, and then breaking such shunt-circuit.

14. The method of reversing an electric motor, consisting in establishing a shunt-circuit around its field-magnet and armature, reversing their relative connections while such shunt-circuit exists, and then interrupting such shunt-circuit.

15. The method of reversing a shunt-wound electric motor, consisting in disconnecting the motor from the line-circuit, establishing a shunt-circuit around its field-magnet, reversing the relative connections of the field-magnet and armature while such shunt-circuit exists, then interrupting such shunt-circuit, and completing the line connections.

In testimony whereof I have hereunto set my hand this 3d day of February, 1892.

JONATHAN P. B. FISKE.

Witnesses:
JOHN W. GIBBONEY,
BENJAMIN B. HULL.